United States Patent [19]

Lerner

[11] Patent Number: 5,238,665
[45] Date of Patent: Aug. 24, 1993

[54] METHOD FOR MINIMIZING ENVIRONMENTAL RELEASE OF TOXIC COMPOUNDS IN THE INCINERATION OF WASTES

[75] Inventor: Bernard J. Lerner, Pittsburgh, Pa.

[73] Assignee: Beco Engineering Company, Oakmont, Pa.

[21] Appl. No.: 712,475

[22] Filed: Jun. 10, 1991

[51] Int. Cl.$^5$ .................... B01D 53/34; F23G 5/00
[52] U.S. Cl. .................... 423/240 S; 423/210; 423/245.2; 423/245.3; 110/345; 588/205
[58] Field of Search .......... 423/244 R, 244 A, 242 A, 423/242 R, 240 R, 240 S, 210, DIG. 18, DIG. 20, 245.2, 245.3; 110/215, 345; 588/205

[56] References Cited

U.S. PATENT DOCUMENTS

| | | | |
|---|---|---|---|
| 3,601,070 | 8/1971 | Lambiris | 110/238 |
| 4,019,444 | 4/1977 | Kleeberg et al. | 423/240 |
| 4,620,492 | 11/1986 | Vogg et al. | 110/216 |
| 4,844,875 | 7/1989 | Ettenadieh | 423/210 |
| 4,889,698 | 12/1989 | Moller et al. | 423/210 |
| 5,002,743 | 3/1991 | Kokkonen et al. | 423/244 |
| 5,018,457 | 5/1991 | Brady et al. | 110/215 |
| 5,035,188 | 7/1991 | Johnson et al. | 110/345 |

FOREIGN PATENT DOCUMENTS

| | | | |
|---|---|---|---|
| 66707 | 12/1982 | European Pat. Off. | 423/242 |
| 2817272 | 10/1979 | Fed. Rep. of Germany | 110/238 |

Primary Examiner—Wayne Langel
Assistant Examiner—Peter T. DiMauro
Attorney, Agent, or Firm—Roylance, Abrams, Berdo & Goodman

[57] ABSTRACT

A method and apparatus for minimizing the environmental release of acids and toxic organic compounds from a waste incinerator-air pollution control train. The apparatus comprises an incinerator, a gas cooling means such as a waste heat boiler or quench chamber, a means for the partial removal of acid gases and dioxins by contact with either finely-divided alkaline solids or alternatively, by an alkaline solution in a spray drier-absorber, a dry solids collection means such as a fabric filter or electrostatic precipitator, a wet scrubber means for residual metal, dioxin/acid gas removal and an induced draft fan. In the method of this invention, the final wet scrubber stage operates without alkaline neutralization, but under scrubber acid concentrations and operating conditions that provide an exhaust gas within compliance limits of emission regulations. The contaminated liquor blowdown from the wet scrubber, which contains toxic organics and acids, is recycled back into the incinerator. The aqueous acid liquor blown down to the incineration is vaporized therein, most of the toxic organic content of the liquid is destroyed by the re-incineration, and the regenerated acid gases are largely removed by the first dry scrubbing state.

7 Claims, 3 Drawing Sheets

METHOD FOR MINIMIZING ENVIRONMENTAL RELEASE OF TOXIC COMPOUNDS IN THE INCINERATION OF WASTES

FIELD OF THE INVENTION

Combustion off-gases from the incineration of medical and other wastes contain a variety of chemical compounds known to be inimical to human health. Among these combustion products are the acid gases, HCl and $SO_2$, toxic metals compounds, and toxic organic compounds. The toxic organic compounds include material such as polyaromatic hydrocarbons and chlorinated organic compounds. The latter compounds are carcinogenic in very small concentrations and typically comprise the polychlorinated biphenyls (PCBs) and, in particular, the chlorinated dioxins and dibenzofurans. For the purposes of this specification, "TOC" shall serve as the abbreviation for toxic organic compounds and shall denote 2,3,7,8 tetrachlorodibenzo-dioxin (TCDD), the pentachloro-, hexachloro, heptachloro- and octachloro-homologs, and the dibenzofuran analogs, as well as PCBs. Although efficient combustion at temperatures above 800° C. can reduce TOC to parts per trillion (ppt) levels, non-ideal furnace conditions, such as poor mixing, low temperatures and low oxygen concentrations, may exist in at least parts of an incinerator, and usual TOC emission levels from waste incinerators may be at least an order of magnitude higher than parts per trillion levels.

BACKGROUND OF THE INVENTION

This invention relates to the removal of pollutants from the exhaust gases resulting from the incineration of wastes. The invention particularly relates to the removal of acid gases, toxic organic and toxic metal compounds from biomedical waste incinerator exhaust gases by a method and apparatus that minimizes emission of contaminants to the environment. This invention further relates to the removal of pollutants from waste incinerator exhaust gases by means combining both dry and wet scrubbing, but which avoids the production of a contaminated liquid byproduct waste stream and its release to the environment.

The incineration of medical and municipal wastes, which typically contain halogenated compounds in the form of plastics and solvents, yields relatively large amounts of TOC in the off-gas, as well as the acid gases, HCl and $SO_2$, and toxic metals. In the incineration of biomedical wastes, negligible amounts of $SO_2$ are typically evolved, and the major acid gas in the exhaust gases is HCl. Three major types of prior art methods have been employed for the removal of these pollutants from incinerator flue gases: spray-dryer/solids-removal, dry alkaline solids gas contacting/solids-separation and wet scrubbing. Each of these methods are deficient in effecting the removal from the gas of one or more classes of the pollutants in incinerator off-gases.

Wet scrubbing comprises contacting of the combustion gases with an aqueous scrubbing solution in an efficient gas-liquid contactor. Typically, wet scrubbers use an alkaline solution of alkali metal or alkaline earth carbonate or hydroxide for neutralization of the absorbed acid gases. Wet scrubbers are highly efficient devices for the removal of the acid gases and the TOC components in the gas, but do not provide satisfactory removal of the particulates or toxic metals. Wet scrubbers also suffer from the fact that they product a contaminated liquid blowdown stream.

Spray drier/absorption methods for incinerator off-gas treatment are of fairly recent origin, and a review of the various forms of this technology has been given by Kroll and Williamson, "Application of Dry Flue Gas Scrubbing to Hazardous Waste Incineration", Journal of the Air Pollution Control Association, pp. 1258-1263, Vol. 36, No. 11, November, 1986. True dry scrubbing, i.e., removal of pollutants by means of dry aklaline powder contacting, is described by Muzio and Offen, in the Journal of the Air Pollution Control Association, Vol. 37, pp. 642-653, May, 1987. Dry scrubbing comprises the introduction of a finely-divided alkaline solid material into intimate contact with the flue gas, followed by solids separation from the gas. The preferred reactant is hydrated lime (calcium hydroxide) although where economically or chemically justified, sodium carbonate or bicarbonate may be used as the alkaline reactant.

In the present context, "dry scrubbing" shall mean means for contacting hot combustion gases with a finely-divided alkaline solid at temperatures above the dew-point of the gas, followed by a solids collector such as a fabric filter (baghouse) or electrostatic precipitator (ESP). Also in the present context, "spray drier scrubbing" shall mean means for contacting hot combustion gases with an aqueous alkaline solution or dispersion in a spray dryer, follower by a fabric filter or ESP collector.

Dry and spray-drier scrubbing processes, with ESP or baghouse filtration as solid separation means, can remove almost all of the particulates, as well as significant fraction of the acid gases and toxic metals in the flue gas from biomedical waste incinerators. For example, conventional dry scrubbing with hydrated lime can remove major fractions of the HCl in the gas, and dry scrubbing with sodium bicarbonate can remove major fractions of the $SO_2$, as well as the particulate fraction. However, these methods fail to effectively remove the TOC class of pollutants and volatile toxic metals such as mercury.

The residual TOC levels remaining in the gas in both dry and spray drier scrubbing are typically not acceptable for environmental discharge. In the case of spray drier scrubbing, the addition of activated carbon in, or after, the spray drier scrubbing stage to effect more efficient dioxin and mercury removal is taught by the prior art. Moller, et al., in U.S. Pat. No. 4,889,698, reviews the art of activated carbon addition in, or downstream of, a spray drier scrubber for mercury and dioxin removal, and teaches the use of a powdered activated carbon as a supplement to spray drier technology to improve the removal of dioxins and mercury. The efficient removal of the pollutants with powdered activated carbon adsorbent in spray drier scrubbing occurs when sufficient water is evaporated to cool the flue gas to 100° C.-130° C. The latter gas-moisturizing condition engenders corrosion and/or failure of the solids separation equipment. Further, the use of activated carbon for dioxin/mercury removal from the gas phase is uneconomic, and requires secondary treatment of the contaminated carbon prior to disposal.

The deficiencies of the spray drier scrubber or dry powder scrubber can be compensated for by adding a wet scrubber gas treatment stage downstream of the dry scrubber stage. The wet scrubber will effectively remove the residual acid gases and TOC's that typically penetrate the dry treatment stage. Thus, an emission control system comprising a dry scrubber, or a spray drier/absorber, and a wet scrubber operating downstream on the filtered gas, will provide high removal efficiency for all classes of the toxic pollutants; acid gases, toxic metals, particulates and TOC.

The wet scrubber stage of an incinerator emission control system is typically operated with a scrubber recycle liquor solution containing an alkaline material, such as caustic, to neutralize the absorbed residual acid gases. The use of caustic neutralization in a wet scrubber has several disadvantages. Combustion gases from an incinerator contain carbon dioxide as a principal product of combustion, and, as an acid gas, carbon dioxide is absorbed by the alkaline scrubber solution. Unless the scrubber makeup water supply is "soft" water, that is, pretreated to remove calcium hardness, then insoluble calcium carbonate precipitates from the scrubber solution. This precipitate tends to foul and plug the scrubber, and continuous stable operation demands the use of softened water, which can become very expensive. Additionally, alkaline neutralization of the scrubbing liquor generates a solution of sodium chloride from the HCl content of the liquor. In order to keep the liquid solution from salting up, a liquid blowdown stream is typically taken off the wet scrubbing liquor recycle at a rate sufficient to avoid the precipitation of salt in the recycle solution. In most cases, the byproduct liquid stream from this wet scrubbing stage which is heavily contaminated with TOC's is passed either to a municipal or in-plant waste treatment system, which does not remove or destroy the major liquid contaminants.

The hazardous and toxic pollutants removed from the gas in the wet scrubber are thus eventually discharged to the environment in a form which can readily enter drinking water or recreational water supplies and thus expose the general public to these hazardous pollutants. In terms of dioxin content, the Environmental Protection Agency has recommended a 0.014 parts per quadrillion limit for the content of receptor bodies of water, so that waste streams discharging into existing water bodies must necessarily be very low in dioxin content. The contaminated liquid blowdown discharge is one of the major drawbacks to the use of wet scrubbers in waste incinerators off-gas cleanup.

Kokkonen, et al, in U.S. Pat. No. 5,002,743, teach the evaporation of alkaline wet scrubber liquor from the flue-gas scrubbing stage. Evaporation of the wet scrubber blowdown does not destroy the TOC contained in the liquor, it merely concentrates these toxic compounds, as well as the contained salt and the concentrated waste must be treated as a highly hazardous material. Evaporation within the air pollution control train is self-defeating, inasmuch as such a practice would quickly raise the gas concentrations of TOC, saturate the wet scrubber liquid with TOC, and discharge high TOC levels in the gas leaving the scrubber. Thermal destruction is known to be the only practical option for TOC-containing streams. However, incineration of the blowdown alkaline wet scrubber solution to thermally destroy the TOC content is not feasible because the salts and liquid alkalinity would rapidly attack and destroy the refractory lining of an incinerator. Continued discharge of the waste liquid stream from such wet scrubbing stages therefore represents an ongoing ecological threat which has not been satisfactorily resolved.

SUMMARY OF THE INVENTION

It is an object of this invention to provide a novel method and apparatus for the efficient removal of pollutants from the exhaust gas emissions resulting from the incineration of wastes. It is another object of this invention to provide a method and apparatus which is capable of treating the waste incineration off-gases by means of sequential treatment stages in which the first treatment stage is a dry or spray drier scrubbing stage and the final stage is a wet scrubbing stage. It is a further object of this invention to remove particulates, acid gases, and toxic organic compounds from waste incinerator exhaust gases by a method and apparatus that minimizes emission f contaminants to the environment without the concomittant production of a liquid waste stream. It is still a further object of this invention to capture toxic organic and inorganic materials in a liquid scrubbing stream and to recycle the toxic materials to the combustion chamber and re-incinerate the organics, optimizing their destruction and preventing their emission to the environment. It is still a further object of this invention to recycle the toxic inorganic materials captured in a liquid scrubbing stream to an incinerator and to recapture these contaminants in a dry or spray drier scrubbing stage whose solid discharge materials may be disposed of in an environmentally secure form.

To achieve the forgoing objects, the apparatus of this invention comprises a means for waste incineration, an optional cooling means for the effluent combustion gases, a means for removal of the particulates plus a major fraction of the acid gas and toxic metals by dry or spray drier scrubbing/fabric filtration means, and a final wet scrubbing means for efficient removal of the residual acid gases and toxic metals and organics. In the practice of this invention, the wet scrubber stage is operated without neutralizing alkaline compound injection and the acid liquid bleedoff stream from the wet scrubber stage is recycled back to the incinerator. The recycle stream contains only TOC, toxic metals and acids. The toxic organics in the liquid are largely destroyed by the re-incineration. The aqueous acid liquor blown down to the incineration is vaporized therein and the combined acid gas content of the effluent combustion gases resulting from TOC incineration, waste incineration and acid liquor recycle, is then removed to a major extent by the first-stage dry scrubbing/filtration means in the gas treatment train. Contaminants remaining in the gas after the first stage of gas treatment, principally TOC's, are removed in the final wet scrubbing stage. Scrubber liquid blowdown is sent back to the incinerator, where the recovered TOC is destroyed.

The wet scrubber means of this invention, located downstream of the dry scrubber or spray drier means, uses a caustic-free, salt-free, recycle aqueous acid solution as the absorbing medium. Fresh water is used as makeup to the recycle scrubbing liquid, and no neutralization is carried out. The process of water absorption of the acid gases sans neutralization results in a TOC and toxic metal-containing, salt-free, acid liquor blowdown which can be recycled back to the incinerator or secondary combustion stage, without causing damage to the furnace or to the furnace lining. Total blowdown recycle to the incinerator results in zero liquid discharge to the environment and no increase in TOC emissions with the gas.

DETAILED DESCRIPTION OF THE INVENTION

Figure 1:
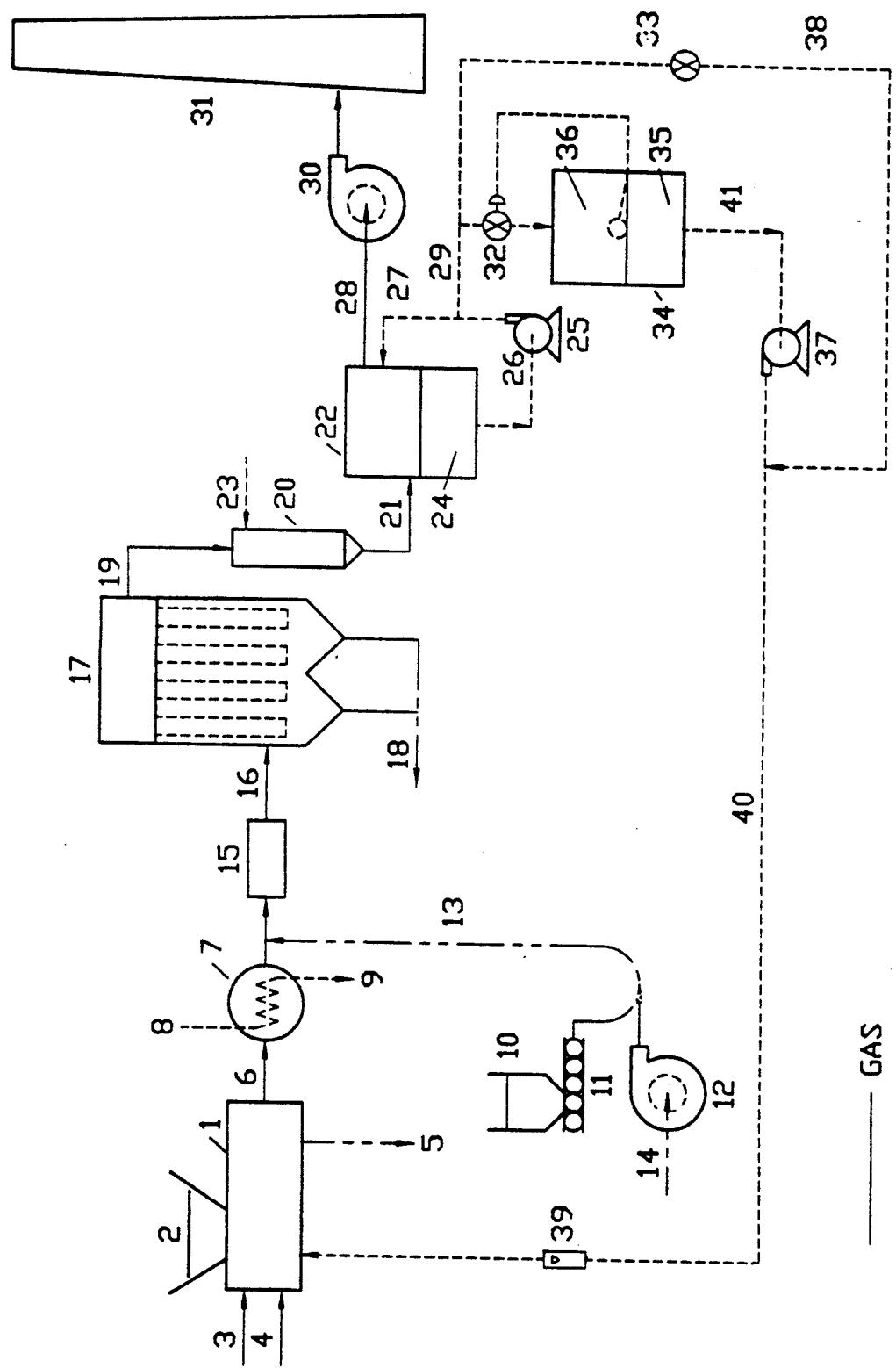
FIG. 1 is a schematic flow drawing illustrating one embodiment of this invention in which dry reagent injection and fabric filtration is employed for first-stage removal of pollutants.

In FIG. 1, the wastes are fed to the incinerator 1 through a ram or chute 2. The incinerator is heated by burning natural gas 3 in air 4 until the combustion of the wastes provides sufficient heat to sustain the necessary incinerator temperatures. Bottom furnace ash 5 is removed from the incinerator and the combustion exhaust gases 6 exit to a waste heat boiler 7. In the waste heat boiler 7 the boiler water feed 8 is converted to steam 9, and the gas temperature exiting the waste heat boiler is at a level compatible with either fabric filtration or electrostatic precipitator solids collection. Finely-divided solids, such as hydrated lime or sodium bicarbonate, are fed from a hopper 10 to a screw feeder 11 and then to a pneumatic feed line 13, supplied by a blower to compressor 12 operating on an air stream 14.

The pneumatically-conveyed solids are mixed with the incinerator flue gas in a distributor device 15 prior to gas 16 entry into a fabric filter baghouse 17. The fly ash and reacted alkaline solids are removed in the baghouse 17 and are conveyed to disposal or collection bins 18. The filtered gas 19 leaving the baghouse 17 enters a quench duct 20 in which the gas is evaporatively cooled by means of a water spray 23. Alternatively, recycle liquor 27 or blowdown acid solution may be substituted for all or part of the water spray 23. The cooled gas 21 enters a wet scrubber 22 in which the gas is contacted with recycle scrubbing liquor, taken from a reservoir 24 and recycled by a pump 25. Liquor is bled off the recycle liquid conduit 27 through conduit 29 and is directed to the incinerator through conduits 38 and 40, at a rate metered by flowmeter 39 and controlled by valve 33.

Conduit 38 contains a valve 33 which when open allows direct feed of the blowdown liquid stream to the incinerator through conduit 40. When valve 33 is closed, the blowdown stream 29 is directed to an accumulator reservoir 34 through a conduit containing an automatic control valve 32. With valve 33 closed, the contaminated liquor 35 is withdrawn from the reservoir 34 by means of a pump 37 and is sent through conduit 40 to the incinerator for disposal. An automatic control valve 32 operated by a liquid level controller 36 in reservoir 34 allows liquid blowdown from the scrubber recycle stream to enter the accumulator reservoir to compensate for liquor withdrawn by pump 37 and sent to the furnace through conduit 40.

Figure 2:
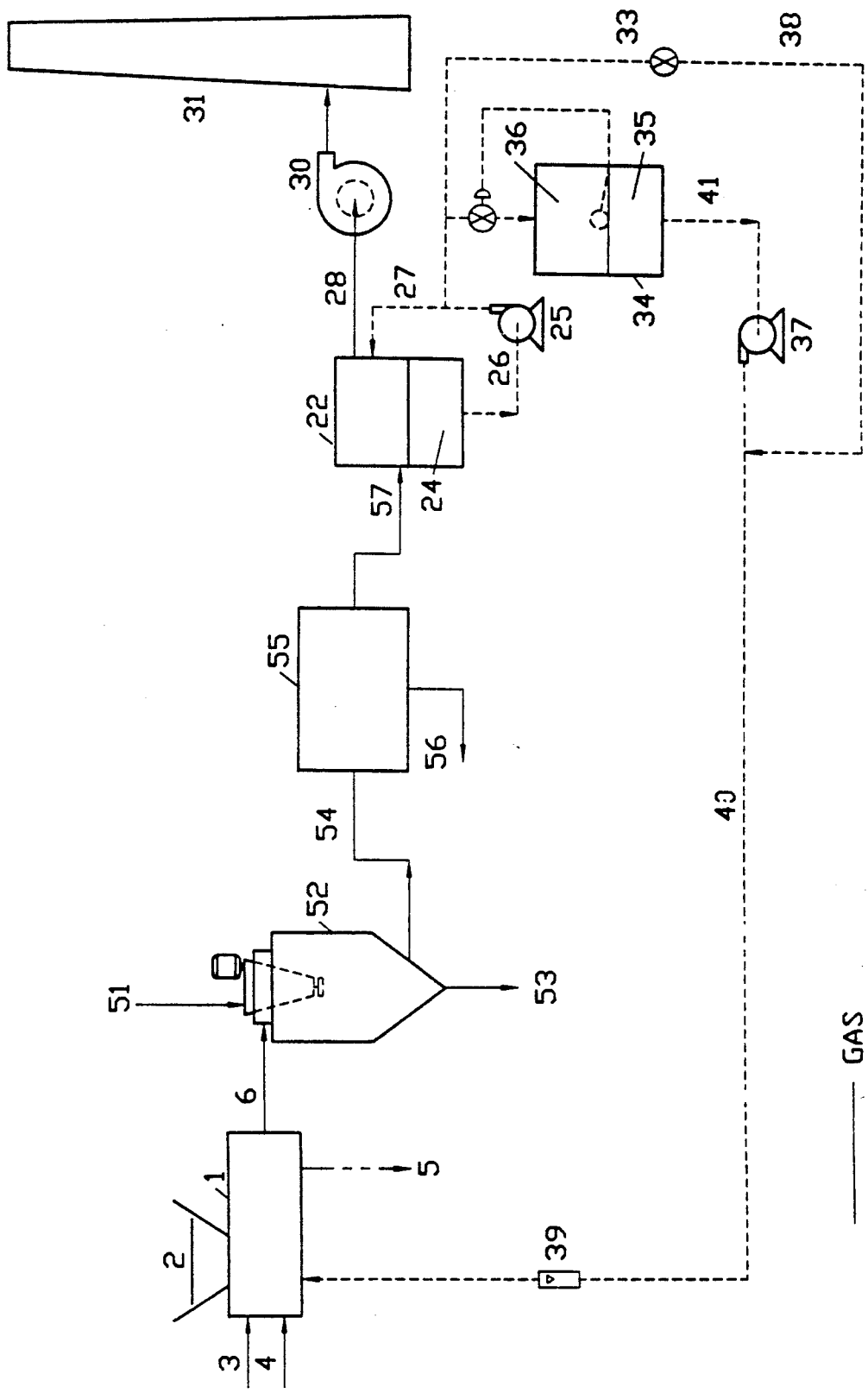
FIG. 2 is a schematic flow drawing illustrating an alternative embodiment of this invention in which spray-drier reaction and ESP solids separation is employed for initial removal of pollutants. It is obvious to those skilled in the art that the dry injection contacting means of FIG. 1 can be employed with the ESP solids collection means of FIG. 2. Also, the fabric filter baghouse means of FIG. 1 may alternatively be employed as the collection means for the spray drier scrubber of FIG. 2. In both FIGS. 1 and 2, the wet scrubber comprises a single recycle liquor scrubbing stage, and the contaminated blowdown is re-incinerated in the incinerator.

FIG. 2 embodies the same incineration and wet scrubbing schematic as does FIG. 1, but utilizes alternative optional spray drier contacting and solids collection means for the primary pollutant removal stage. In FIG. 2, as in FIG. 1, the wastes are fed to the incinerator 1 through a ram or chute 2, and the preheating of the incinerator utilizes the same arrangement as is shown in FIG. 1. Bottom furnace ash 5 is removed from the incinerator and the combustion exhaust gases 6 exit directly to a spray drier-contactor 52. A lime slurry 51 is sprayed into the hot gas where it partially reacts with the acid gases, metal oxides and TOC's. The dried reacted solids leave the spray-drier both in solids discharge stream 53 and with the cooled gas stream 54. The gas stream 54 is conducted to electrostatic precipitator 55, where the dried solids and fly ash are removed from the gas and discharged in stream 56.

The cleaned gas 57 leaving the electrostatic precipitator 55 enters a wet scrubber 22 as in FIG. 1, with an identical recycle and downstream liquor flow arrangement as in FIG. 1. Again, the cleaned gas is exhausted by blower 30 to stack 31.

Figure 3:
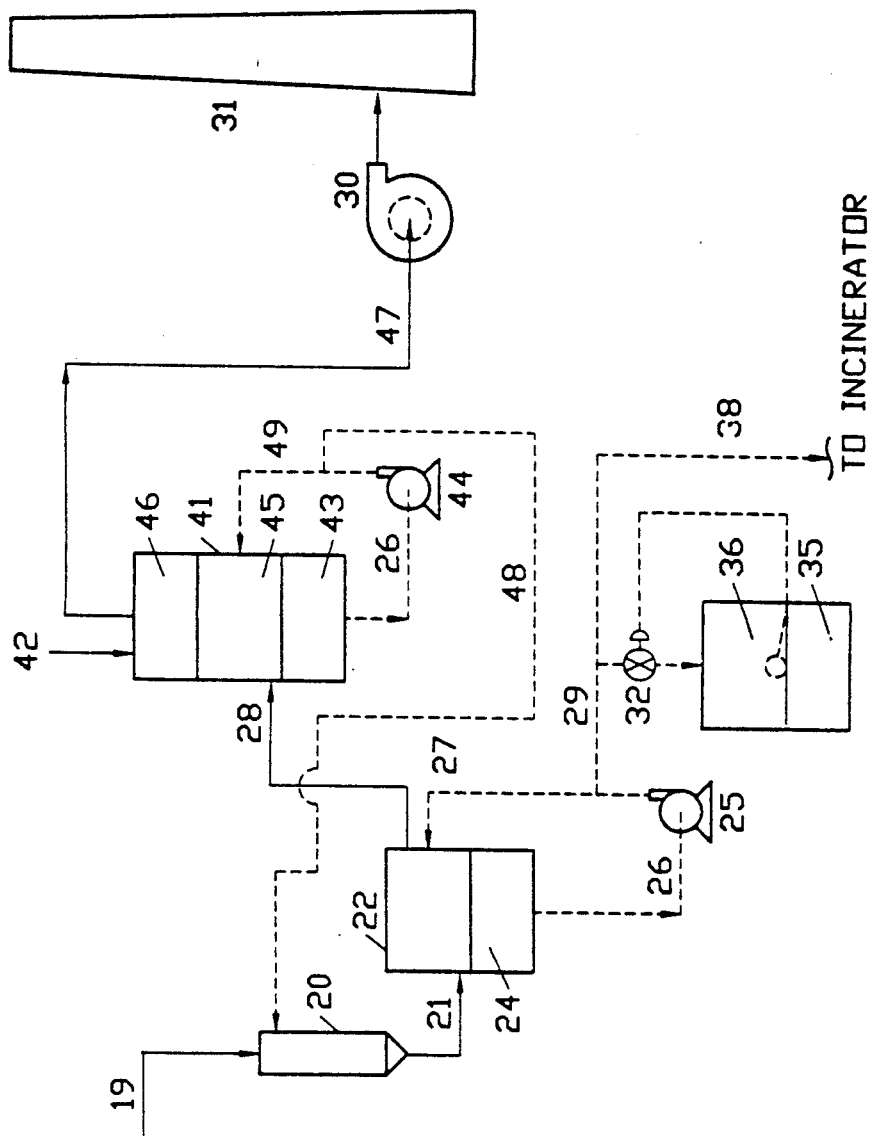
FIG. 3 is a drawing illustrating another embodiment of this invention in which series wet scrubbers are used, and in which the primary wet scrubber operates with a relatively concentrated recycle liquor and the secondary wet scrubber operates with a more dilute recycle liquor, which embodiment allows more highly concentrated blowdown solutions and thus reduced rates of liquor feed to the incinerator, while achieving compliance levels of HCl emissions in the scrubbed gas.

FIG. 3 illustrates another embodiment of the invention in which multiple wet scrubbing stages allow an increase in liquid acid concentration blown down to the incinerator and a proportional reduction in the blowdown rate going back to the incinerator.

In FIG. 3, the particulate-free gas stream 19 coming from the baghouse of FIG. 1 is quenched in the quench duct 20, and then flows through conduit 21 to the first wet scrubber 22. In wet scrubber 22 the gas is contacted with recycle aqueous acid liquor recycled from reservoir 24 by pump 25 through conduits 26 and 27. As in FIG. 1, blowdown liquid is taken off the branch conduit 29 of the pump discharge conduit 27 to either conduit 38 feeding back to the incinerator or to the blowdown accumulator tank 36 through the control valve 32. The gas from the first wet scrubber 22 leaves the scrubber through conduit 28. In FIG. 3, the gas leaving the first wet scrubber enters the second wet scrubber 41. The second wet scrubber comprises a recycle liquid reservoir 43, a recycle liquid contact stage 45, and a final makeup water contact stage 46. Dilute aqueous acid is recycled from liquid reservoir 43 through pump suction line conduit 26 through pump 44 and pump discharge conduit 49 to the recycle contact stage 45 where it contacts the gas entering the scrubber through conduit 28. The gas leaving the recycle contact stage 45 flows through contact stage 46 where it is contacted with makeup water introduced through conduit 42. The gas leaves the second scrubber 41 through conduit 47 and enters the blower 30 which discharges to the stack 31. Part of the dilute acid recycle liquor circulating through conduits 26 and 49 of the second scrubber is fed back through conduit 48 to quench duct 20 leading to the first wet scrubber stage at a rate in excess of the evaporation rate in quench duct 20. The excess acid liquid, concentrated by evaporation, enters the first wet scrubber 22 along with the quenched gas through conduit 21. The recycle acid liquor concentration in the first wet scrubber is thus maintained at higher acid concentrations than the recycle liquor of the second wet scrubber. The method of FIG. 3 allows reduced rates of liquor blowdown to the incinerator within the context of meeting the allowable acid emissions in the exhaust gas.

SPECIFIC EXAMPLE 1

One thousand pounds per hour of medical wastes, containing an average chloride content equivalent to 26 lb/h of HCl, are burned in a hospital incinerator. The incinerator exhaust gas flow is measured as 2385 dry standard cubic feed per minute (DSCFM). The gas HCl concentration is 1563 ppmv. The hot gas leaves the incinerator at 1800[+]o[+]F. and enters a 2-pass waste heat boiler, where it is cooled to 410° F. The gas then enters a fabric filter baghouse having a cloth area of 1336 sq. ft. providing for a maximum 5:1 air/cloth ratio, using 14-foot long bags. Hydrated lime powder is introduced into the gas in the baghouse inlet duct by pneumatic conveyance at a rate of 52.8 lb/h, which is equivalent to a stoichiometric ratio of approximately 2.0, based on entering gas HCl content. The lime is dispersed in the hot gas in the baghouse approach duct by means of a vortex-inducing baffle.

In the baghouse, 80% of the entering HCl and toxic metals are removed by the lime. The solids filter cake discharged from the baghouse comprises 31.7 lb/hr of calcium chloride, an equal amount of unreacted Ca-(OH)$_2$, 2.04 lb/hr of fly ash and $1.525 \times 10^{-7}$ lb/hr of TOC. The baghouse outlet gas contains 313 ppmv (5.21 lb/h) of HCl and $6.53 \times 10^{-8}$ lb/h of TOC, equivalent to a TOC gas concentration of 7.315 nanograms per dry cubic meter (ng/DSCM).

The hot gases leaving the baghouse are quenched to the wet bulb temperature of 138° F. (58.9° C.) in a downflow quench duct prior to entering the wet scrubber. In the quench process, approximately 1.4 GPM of water evaporate. The wet scrubber employed for tailgas treatment is a horizontal crossflow spray scrubber utilizing recycle liquor sprays, operating at a rate of approximately 7 gallons/1000 CF, at a recycle acid concentration of 4% by weight HCl. No neutralizing agent is added to the acid, and the wet scrubber is fabricated of thermoplastic and thermoset resin materials which are fully corrosion-resistant to the acid.

After the wet scrubber treatment of the gas, the gas is exhausted to the atmosphere. By analysis, the HCl concentration in the gas is 10 ppmv, uncorrected, equivalent to an emission rate of 0.167 lb/h. The TOC concentration, expressed as standard NIH toxic equivalence factors, is 0.173 ng/DSCM, equivalent to a rate of $1.54 \times 10^{-9}$ lb/h. The exhaust flow measures as 2385 DSCFM, equivalent to 4052.7 DSCM/h. The moisture content of the exhaust gas is 12.7 volume %, so that the exhaust rate of the wet gas is 2731 SCFM. The emission regulations stated for this hospital waste incinerator call for a TOC emission not to exceed 10 ng/DSCM, based on NIH toxic equivalence factors, and an HCl emission not to exceed 30 ppmv, dry gas, corrected to 7% oxygen content. For a moist flue gas from a combustion process using excess air, applying the corrections for moisture and excess oxygen reduces the corresponding actual (wet, uncorrected) allowable HCl concentration to the range of 15-20 ppmv. The TOC emission requirement for this incinerator is 1.0 ng/DSCM. Both the HCl and TOC contents of the exhaust gas are well within compliance limits.

However, to maintain the recycle liquor concentration in the wet scrubber at 2% HCl, a scrubber blowdown stream of 30.2 gallons per hour (GPH), or 252 lb/h of solution, must be taken. This scrubber blowdown contains 5.04 lb/hr of HCl and a TOC content of $6.376 \times 10^{-8}$ lb/hr, or 0.25 ppb. This concentration is several orders of magnitude above the EPA-recommended level for natural bodies of water. To avoid discharge of this stream, the contaminated blowdown stream is pumped back to the incinerator, where it is sprayed into the chamber and re-incinerated. This eliminates the possibility of release of the contaminated liquid stream to the atmosphere or groundwater, and provides for repeated destruction of the TOC and the recapture of the blowdown acids at high efficiency in the alkaline reactant of the dry scrubber or spray drier scrubber means of the gas treatment train.

SPECIFIC EXAMPLE 2

In Specific Example 1, the 30.2 GPH of aqueous liquid injected into the incinerator represents an extra thermal burden on the furnace of about 252,000 Btu/h, and in some situations, this may be considered undesirably high. Further, the scrubber blowdown recycle-to-furnace evaporation load is proportional to the total HCl load from the furnace, and the recycle blowdown rate required to maintain the scrubber solution at constant HCl concentration will increase with recycle. This may eventually cause the HCl content of the gas leaving the wet scrubber to exceed the allowable limits. It is therefore desirable to: (a) treat the gas with the most dilute aqueous acid stream possible prior to its exhaust to the stack and (b) blow down the least amount of liquid to the furnace, i.e., the most concentrated acid. These objectives may be achieved by the method of the wet scrubber flow scheme shown in FIG. 3. The gas may be scrubbed in two or more scrubbers or scrubber stages in series, each with separate liquid recycles, with feed of makeup water to the secondary dilute liquor scrubber as shown in FIG. 3, and flow of the excess liquid from a dilute loop to the concentrated liquid recycle loop.

The operating parameters of the series scrubbers in terms of HCl concentrations in the respective recycle liquors may be determined from vapor pressure data. At typical wet bulb temperature range of 50 to 60[+]o[+]C., the partial pressures of HCl over its aqueous solution are given in Perry's Chemical Engineers Handbook, Fifth Edition, page 3-62, as follows:

TABLE I

| | Vapor Pressure of HCl in mm Hg or ppmv | | | |
|---|---|---|---|---|
| | Temp = 50° C. | | Temp. = 60° C. | |
| Wt. % HCl | mm Hg | ppmv | mm Hg | ppmv |
| 2 | 0.0014 | 1.8 | 0.0038 | 5.0 |
| 4 | 0.0064 | 8.4 | 0.0165 | 21.7 |
| 6 | 0.0163 | 21.4 | 0.040 | 52.6 |
| 8 | 0.0344 | 45.3 | 0.081 | 106.6 |
| 10 | 0.0690 | 90.8 | 0.157 | 206.6 |
| 12 | 0.136 | 178.9 | 0.305 | 401.3 |
| 14 | 0.275 | 361.8 | 0.60 | 789.5 |
| 16 | 0.55 | 723.7 | 1.17 | 1539.5 |

For the conditions of Example 1, with a gas concentration of 313 ppmv HCl and a gas temperature of 59° C. entering the first-stage scrubber, the recycle liquid concentration cannot exceed approximately 3% HCl by weight while maintaining the necessary 10 ppmv HCl equilibrium partial pressure in the exhaust gas. The scrubber may, however, be operated in accordance with FIG. 3 with a maximum of 11% HCl liquid recycle concentration (equivalent to the 313 ppmv HCl present in the entering gas) if a maximum of 3% by weight recycle solution is used in the secondary scrubber. Using the vapor pressure data in the HCl vapor pressure table, and a margin of safety in solution concentration similar to that used in the operation of the scrubber of Example 1, the primary wet scrubber recycle has a concentration of 8% HCl and the secondary wet scrubber stage is operated with a recycle concentration of 2.6%. Under these conditions, 3.32 lb/h of HCl is removed in the first wet scrubber stage, and 1.55 lb/h of HCl is removed in the second scrubber stage. Blowdown is taken from the secondary scrubber recycle stream to the quench duct leading to the first scrubber at a rate sufficient to maintain the 8% HCl concentration in the primary scrubber recycle liquor. This rate is equal to the evaporation rate in the quench duct plus the blowdown rate from the primary scrubber recycle stream. The resulting blowdown rate to the furnace from the primary scrubber recycle stream is 63 lb/h, or 7.6 GPH, containing 5.04 lb/h of HCl. The consequent heat loss in the furnace is reduced by a factor of 4 compared to the use of a single wet scrubber stage in Example 1.

What is claimed is:

1. A method for reducing the discharge of contaminated liquid streams in the treatment of hot waste incinerator exhaust gases containing hydrochloric acid gas, particulate fly ash, toxic metal oxides and toxic organic compounds, comprising the steps of:

contacting the exhaust gases with an alkaline material;

reacting the major portion of the hydrochloric acid gas content of the exhaust gases with the alkaline material;

removing substantially all of the reacted spent alkaline material, fly ash and other particulate matter from the gas in a solids separation stage;

treating the particulate-free exhaust gases from the solids separation stage in at least two wet scrubber contact stages operating in series;

operating each of the wet scrubber stages with separate dedicated salt-free aqueous scrubbing solutions;

scrubbing the gas in the successive wet scrubber contact stages with acid solutions of diminishing acid concentration;

absorbing in the scrubbing liquor of the wet scrubber stages substantially all of the residual hydrochloric acid and a portion of the toxic organic compounds from the particulate-free exhaust gases;

operating at least the first wet scrubber stage with a recycle aqueous salt-free scrubbing solution loop;

recycling a portion of the aqueous acid scrubbing solution from a downstream wet scrubber stage to the initial wet scrubber contactor stage;

evaporating water in the initial wet scrubber contactor stage to saturate and cool the hot gases from said solids separator stage;

taken off a portion of the liquid from the first wet scrubber stage liquid recycle loop as a blowdown stream in order to regulate the acid concentration in the liquid recycle circulating around the scrubbing stage;

adding makeup water to the final downstream wet scrubber liquid recycle loop at a rate equal to that lost by evaporation plus blowdown from the initial wet scrubber stage liquid recycle loop;

feeding liquid from the downstream contact stage to the next upstream contact stage to compensate for liquid depletion by blowdown and evaporation from the initial wet scrubber stage or stages;

collecting and conveying the contaminated acid liquid blowdown stream from the initial wet scrubbing liquid recycle loop to the waste incinerator;

reincinerating the acid liquor blowdown stream in the waste incinerator for destruction of the organic toxics;

removing the major portion of the recycled acid gas in the first alkaline dry solids gas treatment stage and thereby eliminating discharge of a contaminated liquid stream to the environment; and thereafter recovering a purified gaseous stream from said wet scrubbing stages.

2. The method of claim 1 in which the wet scrubbing is carried out with acid liquid recycle liquor without alkaline neutralization of the liquor.

3. The method of claim 1, in which the incinerator exhaust gases is initially treated with a spray of alkaline reagent in a spray-drier absorber.

4. The method of claim 1 in which solids and particulates are separated in an electrostatic precipitator or in a fabric filter baghouse.

5. The method of claim 1 in which the liquid depletion of the more concentrated acid scrubbing recycle solutions in the wet scrubber stages is made up by the addition of less concentrated acid solution taken from the next successive downstream recycle solution loop.

6. The process of claim 1 wherein the incinerator exhaust gases are contacted with a finely-divided dry alkaline solid.

7. The process of claim 1 wherein a portion of the recycle aqueous acid scrubbing solution from a downstream wet scrubber stage is recycled to the initial wet scrubber contactor stage by way of a quench duct.

* * * * *